United States Patent [19]

Tybus et al.

[11] 4,256,412

[45] Mar. 17, 1981

[54] ROD-SHAPED CONNECTING ELEMENT

[75] Inventors: Gerd Tybus, Poing; Hilmar Laube, Munich, both of Fed. Rep. of Germany

[73] Assignee: Messerschmitt-Bölkow-Blohm Gesellschaft mit beschränkter Haftung, Munich, Fed. Rep. of Germany

[21] Appl. No.: 102,370

[22] Filed: Dec. 11, 1979

[30] Foreign Application Priority Data

Dec. 22, 1978 [DE] Fed. Rep. of Germany ....... 2855570

[51] Int. Cl.³ .............................................. F16B 11/00
[52] U.S. Cl. ................... 403/267; 156/158; 156/294; 285/174; 403/340; 403/266
[58] Field of Search ............. 403/265, 340, 267, 268, 403/334, 266; 285/DIG. 16, 174, 332; 156/158, 159, 294

[56] References Cited

U.S. PATENT DOCUMENTS

| 2,795,440 | 6/1957 | Holycross et al. ............. 156/294 X |
| 3,545,795 | 12/1970 | Hertel ................... 403/265 |
| 4,027,449 | 6/1977 | Cilveti .................... 403/171 X |

Primary Examiner—Andrew V. Kundrat
Attorney, Agent, or Firm—Toren, McGeady and Stanger

[57] ABSTRACT

In an axially extending rod-shaped connection element a plastics material part having at least one layer of unidirectional fibers is connected to a transition element in an overlapping arrangement. Each of the plastic material part and transition element has an axially extending tapered surface joined by an adhesive layer over the axial length of the overlapping connection. The angle of the tapered surfaces is in the range of 2° to 5° relative to the axial direction of the connecting element.

11 Claims, 2 Drawing Figures

ROD-SHAPED CONNECTING ELEMENT

SUMMARY OF THE INVENTION

The present invention is directed to a rod-shaped connecting element including a rod-shaped, fiber-enforced plastics material part having at least one layer of unidirectional fibers, and at least one transition element for introducing forces into the plastics material part acting in the direction of the fibers. The transition element has a tapered surface extending in overlapping relation with one end of the plastics material part with the overlapping connecting including a layer of adhesive joining the transition element and the plastics material part.

Connecting elements of this type are distinguished by high strength and low weight and they are especially useful in aviation and space travel, for example, as struts or control linkages. As an example, in "Aviation Week" of Aug. 8, 1977, at page 57, a space vehicle is illustrated whose outer surface has connecting elements of carbon fiber-reinforced plastics material with always two of the connecting element joined to triangular transition elements. In such connecting elements, the connection or joint between the plastics material part and the transition elements are particularly critical. Especially in aviation and space travel, such connecting elements are subjected to high vibration forces so that even small cracks in the layer of the adhesive result in a zipper-like separation of the parts which are joined together, because the materials expand differently under load. For this reason, especially high loads are applied to the boundary regions of a tapered overlap so that the adhesively joined tapered overlapping surfaces usually separate at the boundary, particularly when fatigue occurs due to alternating loads.

Therefore, it is the primary object of the present invention to provide a connecting element of the type mentioned above which is distinguished by high stiffness and high strength during static, dynamic and thermal loads, particularly with respect to the connection between the plastics material part and the transition element.

In accordance with the present invention, the tapered surfaces of the plastics material part and the transition element are disposed in overlapping relation with the ratio of the cross-sectional areas of the plastics material part and the transition element adjacent the opposite ends of the overlapping connection being inversely proportional to the modulus of elasticity of the plastics material part and transition element in the direction of the introduced forces. As a result of the overlapping connection between the two members, any changes in length of the members caused by the load are equal on both sides of the tapered overlapping connection. Accordingly, the layer of adhesive securing the two members together is subjected to essentially uniformly distributed shearing forces over the entire region of the overlapping connection. Peak stresses which would otherwise occur at the boundaries of the tapered overlapping connection are significantly reduced in accordance with the present invention.

A connecting element formed of a tube and a transition element for introducing forces is known in U.S. Pat. 4,027,449. The connection between the tube and the transition element, however, is achieved by welding or soldering and requires that the tube and the transition element consist of similar materials, for example, of metal. However, fiber-reinforced plastics material parts usually require a metallic transition element for the introduction of forces. In such a case, the thermal and elastic properties of the plastics material part and the transition element are frequently very different, since the requirements of strength and low weight are the dominant factors in the selection of the materials used.

As is the case in aviation and space travel, in particular when high thermal loads occur in addition to mechanical loads, it is especially advantages that the layer of adhesive include a fiber material with a modulus of elasticity in the range between the modulus of elasticity of the plastics material part and of the transition element. For example, in the case of the advantageous combination of a plastics material part of carbon fiber-reinforced plastics material and a transition element of titanium, glass fibers may be embedded in the layer of adhesive.

Connecting elements provided with an outer fiber lap layer wound around the axially directed fibers affords an especially high stiffness. To assure that the stiffness if not lost at the connection between plastics material part and the transition element during the transmission of axially directed forces, the tapered overlapping connection is advantageously limited to the region of the axially directed fibers. Due to the obliquely extending surface formed by the tapered layer of unidirectional fibers, even where a multi-fiber layer is used, all of the fibers are in contact with the adhesive layer and are connected to the transition element.

With a predetermined geometry of the structural parts, the extent of the surface area of the adhesive layer is determined by the angle of the tapered surface. The taper angle should be within the range of between 2° and 5° relative to the axis of the connecting element, since in such a case the adhesive layer is subjected essentially only to shearing forces. In experiments, a taper angle of 3° has been found to be particularly advantageous. For the transmission of a certain force, a certain minimum adhesive surface area is required. A relatively large adhesive surface area makes it possible to utilize a hollow rod as the plastics material part. Furthermore, the use of a hollow rod increases the strength of the connecting element with respect to bending forces. Especially high tensile and compressive forces can be transmitted by a connecting element where the plastics material part has both an internal and external tapered end surface and where the connection is accomplished by a transition element consisting of one part in contact with the inner tapering surface and another part in contact with the outer tapering surface.

In the case where materials forming the different parts of the connecting element each have a modulus of elasticity differing significantly from the other, it is inevitable that one of the parts will have a significantly larger cross-section than the other part adjacent the overlapping connection. While the thinner part will generally taper to a sharp edge due to the oblique angle used in the overlapping connection, the thicker part will have a certain thickness at its smaller end of the tapered overlapping connection. Though this end portion having a certain thickness contributes little to the strength of the connection, it may lead to peak stresses in the adhesive layer when load is applied. To ensure that the cross-sectional area of the thicker part at its smaller end in the tapered overlapping connection is as small as possible, it is advantageous when, in the region of the overlapping connection, the part of the connecting element having the larger diameter steadily tapers down to the diameter of the smaller part and the other part of the connecting element having the smaller diameter steadily increases to the diameter of the larger part.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
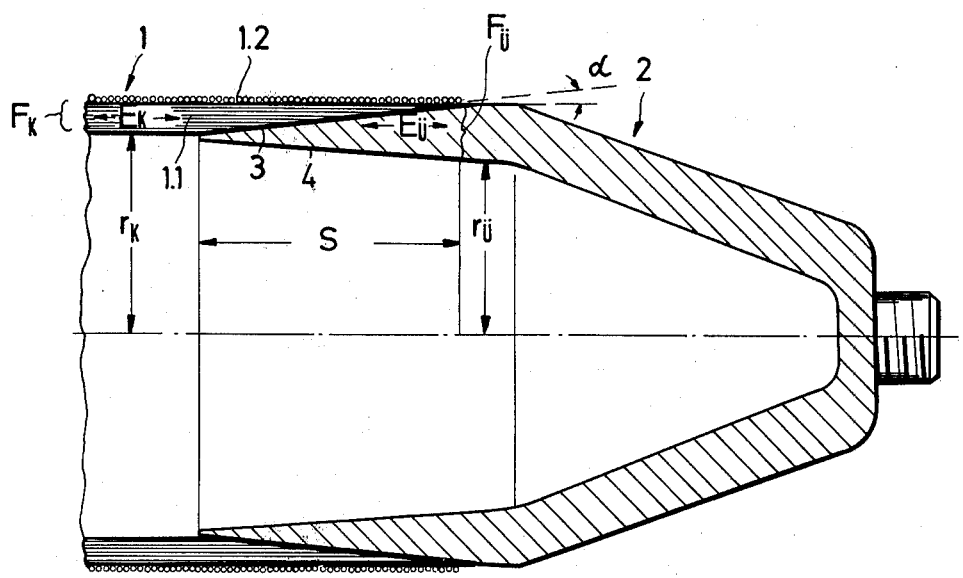
FIG. 1 is a cross-sectional view through a part of a connecting element illustrating the connection between a hollow rod of fiber-reinforced plastics material and a transition element having a centrally arranged threaded connection.

In the connecting element illustrated in FIG. 1, a fiber-reinforced hollow rod consists of an inner layer 1.1 with axially directed or unidirectional carbon fibers surrounded by a carbon fiber lap layer 1.2 with the fibers in the lap layer extending perpendicularly to the direction of the fibers in the inner layer. The unidirectional fibers in the inner layer 1.1 extend in generally parallel relation to the axial direction of the connecting element. The end of the hollow rod 1 has a conically tapering surface with the tapering surface diverging outwardly to the end of the hollow rod. The tapering surface extends outwardly to the inside of the outer lap layer 1.2 and the surface extends at a taper angle $\alpha$ relative to the axial direction of the connecting member. The end of a transition element 2 is the range of the tapered surface of the hollow rod has about the outer surface of the transition element a conical surface area corresponding to that of the hollow rod so that these two tapering surfaces interfit in overlapping relation. As viewed in FIG. 1 the end of the hollow rod 1 overlaps the similarly shaped end of the transition element. The overlapping tapered surfaces of the hollow rod and transition element are secured together over the axial length S of the overlapping connection by means of an adhesive layer 3 of a constant thickness. The cross-sectional areas $F_K$ and $F_U$ of the plastics material part or hollow rod 1 and transition element 2 extending transversely of the axial direction of the connecting element located at the opposite ends of the overlapping connection are dimensioned so that they are in inverse ratio relative to the modulus of elasticity $E_K$ and $E_U$ of the plastics material and the material of the transition element, respectively. These moduli of elasticity refer to the direction of the introduced forces, that is, in the illustrated embodiment, the axial direction of the connecting element. The relationship between the direction of the introduced forces and the direction of the modulus of elasticity is particular important in materials having an anisotropic properties, such as fiber-reinforced plastics material. Because of the different cross-sectional areas of the parts forming the connecting element, the internal radius $r_K$ of the hollow rod or plastics material part and the internal radius $r_U$ of the transition element do not coincide. The internal or inside diameter $r_U$ of the transition element 2 steadily increases through the axial length of the overlapping connection S to the diameter $r_K$, that is, the inside diameter of the hollow rod 1. As a result, peak stresses are prevented from building up within the adhesive layer 3, which stresses would lead to a failure of the adhesive connection under load.

When the rod-shaped plastics material part of the connecting element is formed of a solid material, the overlapping connection is arranged with the transition element laterally surrounding the plastics material part over the axial length of the tapered overlapping connection.

Figure 2:
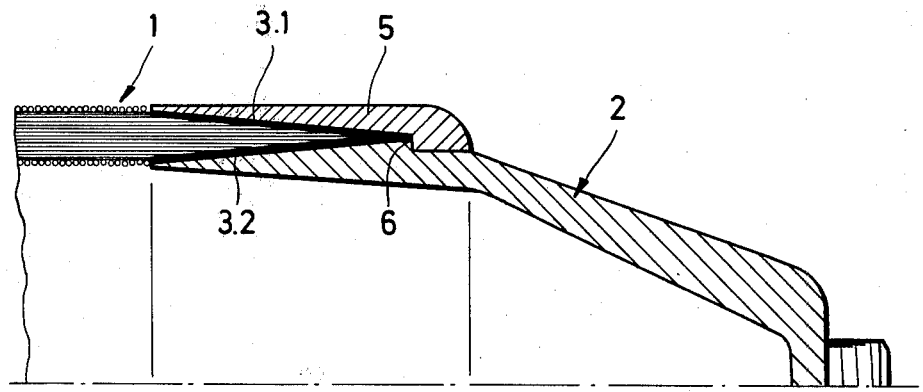
FIG. 2 is a cross-sectional view similar to FIG. 1 utilizing a double-tapered overlapping connection between the plastics material part and the transition element.

In the embodiment illustrated in FIG. 2, the end of the hollow rod-shaped plastics material part 1 is connected to the transition element 2 in a double-tapered overlapping connection. As shown, both the inside and outside surfaces of the hollow rod adjacent its end are conically tapered to the end of the part. As in the embodiment shown in FIG. 1, the end of transition element 2 extending into the hollow rod 1 is provided with a conical tapering surface corresponding to the tapering inner surface of the hollow rod. The outer tapering surface of the plastics material part or hollow rod 1 is overlapped by a conical ring 5. The conical ring is slid over this outer surface of the hollow rod and its position relative to the transition element is fixed by means of a stop 6 formed on the transition element. The plastics material part or hollow rod 1 is connected to the transition element 2 and the conical ring 5 by means of an outer adhesive layer 3.1 and an inner adhesive layer 3.2. The cross-sectional area of the material of the transition element which is determinative of the dimensions is composed of the cross-sectional areas of the conical ring 5 and the transition element 2 adjacent the tapered end of the hollow rod 1.

While specific embodiments of the invention have been shown and described in detail to illustrate the application of the inventive principles, it will be understood that the invention may be embodied otherwise without departing from such principles.

What is claimed is:

1. Rod-shaped connecting element comprising an axially extending fiber-reinforced plastics material part having at least one layer of unidirectional fibers, and at least one axially extending transition element for introducing forces into said plastics material part in the direction of said unidirectional fibers, said plastics material part having a tapered portion, said transition element having a tapered portion with said tapered portions being arranged one overlapping the other, and at least one adhesive layer located between and securing said tapered portions together, wherein the improvement comprises that the overlapped connection of said plastics material part and transition element has a first end and a second end, said plastics material part extends outwardly from said first end of the overlapped connection and said transition element extends outwardly from the second end and the cross sectional areas of said plastics material part extending transversely of the direction between the first and second ends of the overlapped connection at the first end of the overlapped connection and of said transition element extending transversly of the direction between said first and second ends of the overlapped connection at the second end of the overlapped connection are inversely proportional to the modulus of elasticity of said plastics material part and said transition element in the direction of the introduced forces extending in the direction between the first and second ends of said overlapped connection.

2. Rod-shaped connecting element, as set forth in claim 1, wherein said plastics material part being an axially extending part and said transition member being an axially extending part with the axes thereof being in general alignment and the overlapped connection encircling the axis, said tapered portion of said plastics material part located at one end thereof and said tapered portion of said transition element located at one end thereof with the tapered portion surfaces extending at an oblique angle to the axes of said plastics material part and transition element.

3. Rod-shaped connecting element, as set forth in claim 1, wherein said at least one adhesive layer includes a fiber material having a modulus of elasticity in the range between the modulus of elasticity of said plastics material part and the modulus of elasticity of said transition element.

4. Rod-shaped connecting element, as set forth in claim 1, wherein said plastics material part includes a fiber lap layer laterally surrounding said unidirectional fibers with the fiber of said fiber lap layer extending perpendicularly of said unidirectional fibers.

5. Rod-shaped connecting element, as set forth in claim 4, wherein said unidirectional fibers extend in the axial direction of said plastics material part and said tapered connection is limited in the axial direction to the region containing said unidirectional fibers.

6. Rod-shaped connecting element, as set forth in claim 1, wherein the angle α of said tapered portions of said plastics material part and said transition element are in the range of 2° to 5° relative to the axial direction of said plastics material part.

7. Rod-shaped connecting element, as set forth in claim 6, wherein the angle α of the tapered portions of said plastics material part and said transition element is 3° relative to the axis of said plastics material part.

8. Rod-shaped connecting element, as set forth in claim 1, wherein said plastics material part comprises a hollow rod.

9. Rod-shaped connecting element, as set forth in claim 8, wherein the end of said plastics material part forming said tapered connection has an internal tapering surface and an external tapering surface each tapering toward one another to the second end of the overlapped connection, and said transition element comprises a radially inner part having a tapered surface corresponding to and in juxtaposed relation to the internal tapering surface of said plastics material part and a radially outer part having an inwardly directed tapering surface corresponding to and disposed in juxtaposed relation to the external tapering surface on said plastics material part.

10. Rod-shaped connecting element, as set forth in claim 1, wherein for the length of said overlapped connection between the first and second ends thereof the one of said plastics material part and said transition part having the larger diameter tapers inwardly to the diameter of the part having the smaller diameter and the one of said plastics material element and said transition element having the smaller diameter tapers outwardly to the diameter of the larger diameter part.

11. Rod-shaped connecting element, as set forth in claim 1, wherein said plastics material part comprising a carbon fiber-reinforced plastics material and said at least one transition element being formed of titanium.

* * * * *